United States Patent

Horger

[15] 3,639,256
[45] Feb. 1, 1972

[54] ENCAPSULATION PROCESS BY COMPLEX COACERVATION USING INORGANIC POLYMERS

[72] Inventor: Georg Horger, Steppach, Germany
[73] Assignee: The National Cash Register Company, Dayton, Ohio
[22] Filed: May 27, 1970
[21] Appl. No.: 41,110

[52] U.S. Cl. ..................252/316, 117/62.2, 117/100 A, 117/100 B, 260/113, 264/4, 424/16, 424/32, 424/33, 424/36, 424/37
[51] Int. Cl. ..................A61k 9/04, B01j 13/02, B44d 1/02
[58] Field of Search ..................252/316; 117/100 A, 100 B; 424/16, 32, 33, 37; 264/4; 260/113

[56] References Cited

UNITED STATES PATENTS

| | | | |
|---|---|---|---|
| 2,800,457 | 7/1957 | Green et al. | 252/316 |
| 3,016,308 | 1/1962 | Macaulay | 252/316 X |
| 3,112,274 | 11/1963 | Morgenthaler et al. | 252/99 |
| 3,415,758 | 12/1968 | Powell et al. | 252/316 |

*Primary Examiner*—Richard D. Lovering
*Attorney*—E. Frank McKinney and Robert J. Shafer

[57] ABSTRACT

A process is disclosed for manufacturing capsules, en masse, by use of a liquid-liquid phase separation which includes certain inorganic material as complexing, phase-separation-inducing, polymer. The disclosed process is conducted in an aqueous capsule manufacturing vehicle and the material which emerges as a liquid phase is an aqueous solution of organic hydrophilic polymeric material and inorganic polymeric material complexed together. The liquid-liquid phase separation of this invention is the type generally named "complex" coacervation wherein the separated, emergent, liquid phase includes a major portion of both, the organic hydrophilic polymeric material and the phase-separation-inducing material; in this invention, inorganic polyacid polymeric material. The organic polymeric material and the inorganic polymeric material are complexed together by virtue of opposite electrical charges, the complex is at least partially immiscible with the manufacturing vehicle, and the manufacturing vehicle contains only a minor amount of either polymeric material. Preferred materials for use in practicing the present invention include gelatin as the organic hydrophilic polymeric material and polymolybdates and polytungstates as the inorganic polymeric phase-separation-inducing material.

5 Claims, No Drawings

ENCAPSULATION PROCESS BY COMPLEX COACERVATION USING INORGANIC POLYMERS

BACKGROUND OF THE INVENTION

1. Field of the Invention

The present invention relates to a process for conducting a liquid-liquid phase separation having an organic hydrophilic polymeric material as one major polymeric material constituent and an inorganic polymeric material as another major polymeric constituent. The present invention more specifically pertains to a process for manufacturing a separated liquid phase utilizing a complex of an inorganic polymeric material and an organic polymeric material and further relates to a process for manufacturing minute capsules, en masse, having the above-mentioned complex of materials as capsule wall material. The present invention particularly pertains to a method for manufacturing such separated liquid phase and minute capsules wherein the liquid-liquid phase separation is of the type generally named "complex" coacervation and is conducted utilizing an inorganic polytungstate or polymolybdate polymeric material as a complexing, phase-separation-inducing material.

Minute capsules have long been manufactured by utilizing the effects of complex coacervation. The wall material of capsules made by complex coacervation of the prior art are subject to the effects of moisture and humidity from the ambient environment; such effects causing increased permeability where the quality of impermeability is generally desired. Moreover, capsules so-made have utilized relatively expensive materials. Such capsules are manifestly too expensive to be used in many of the applications for which the benefits of encapsulation would, otherwise, be desired. The process and the capsule product of the present invention utilize relatively inexpensive materials and therefore produce relatively inexpensive capsules.

The present process utilizes a polytungstate or polymolybdate inorganic polymeric material as one component in a capsule manufacturing system which yields a complex coacervate as a capsule wall material—a complex coacervate not before having been accomplished using such an inorganic polymer. Nonpolymeric inorganic materials have been previously used to manufacture separated phases of organic hydrophilic polymeric materials for use in capsule walls. In so-called "simple coacervation" of the prior art, the major amount of capsule wall material has been organic hydrophilic polymeric material of a single kind. A considerable proportion of contaminant nonpolymeric, inorganic, phase-separation-inducing material is normally present in practice of that simple coacervation. It is now possible, by the process of the present invention, to manufacture minute capsules by a method of complex coacervation wherein an inorganic polymeric material is utilized and is not a contaminant but takes an active part as a component of the capsule walls by being complexed to the organic hydrophilic polymeric material. The inorganic material above-referenced, is an electrically charged inorganic polytungstate or polymolybdate material which is soluble in an aqueous liquid manufacturing vehicle and which is utilized, according to the process of the present invention, as a complexing, phase-separation-inducing material. Said inorganic polytungstate or polymolybdate material is an important component of capsule walls manufactured by the complex coacervation of the present invention and, by a mechanism not well understood, improves the quality of the capsule walls.

Description of the Prior Art

U.S. Pat. No. 2,800,457 issued July 23, 1957, on the application of Barrett K. Green and Lowell Schleicher and assigned to the assignee herein, discloses that organic hydrophilic polymeric materials can be caused to emerge from solution in aqueous capsule manufacturing vehicles by being complexed with other organic hydrophilic polymeric materials to decrease the solubility of the polymeric materials as they are complexed in the capsule manufacturing vehicle. In the disclosed process of that patent, the emergent phase includes the major portion of both the organic hydrophilic polymeric material to be separated from solution and the organic, complexing, phase-separation-inducing material. The remaining aqueous liquid manufacturing vehicle of that patent contains very little of either of the organic, hydrophilic polymeric materials. The process of that patent relates to the process of the present invention in that it discloses complex coacervation for manufacturing minute capsules, en masse.

U.S. Pat. No. RE 24,899 issued on Nov. 29, 1960, on the application of Barrett K. Green and assigned to the assignee herein discloses that organic hydrophilic polymeric material can be caused to undergo simple coacervation from aqueous solution by the addition, to that solution, of a simple inorganic salt such as ammonium sulfate. That patent discloses a method for making microscopic capsules having walls of a single kind of gelable hydrophilic polymeric material. There is mention, in that patent, of a desirability to remove residual salt from the phase-separated organic hydrophilic polymeric material by washing the polymeric material after phase separation has been accomplished, but there is no mention of complexing of inorganic material with the organic polymeric material to yield a separated liquid phase.

A textbook titled "Colloid Science II", edited by H. R. Kruyt, and published by the Elsevier Publishing Company, New York (1949), contains extensive disclosure of complex coacervation and yet does not disclose that complex coacervation can be accomplished by the use of inorganic polymeric materials. The textbook, "Colloid Science II", also discloses the existence of residual inorganic salt in phase-separated hydrophilic polymeric material which, when dried into films of coacervate is retained as a contaminant to the film.

U.S. Pat. applications Ser. Nos. 586,943 and 701,129 filed Oct. 17, 1966 and Jan. 29, 1968, respectively, on the application of Donald D. Emrick and assigned to the assignee herein, disclose and claim manufacture and treatment of capsule walls wherein the capsule wall material comprises an organic hydrophilic polymeric material and is reacted, in aqueous solution, by uranyl or vanadyl inorganic chemical groups. In those patent applications, however, the uranyl and the vanadyl materials have the effect of irreversibly, chemically, hardening the organic polymeric material substantially instantaneously to a solid compound while in the present invention polymolybdates and/or polytungstates are utilized to provide a liquid, phase-separated, solution of a complex of capsule wall materials. The complex of the present invention is partially soluble in water and exists as a phase-separated liquid solution of capsule wall material.

Several other patents in the prior art, such as British Pat. No. 920,868, granted on the declaration of The National Cash Register Company, Mar. 13, 1963, disclose phase separation processes wherein simple inorganic salts are utilized to accomplish liquid-liquid phase separation of the simple coacervation type. In that British patent, sulfate salts are utilized as the phase-separation-inducing material to accomplish liquid-liquid phase separation of a pigskin gelatin from aqueous solution.

SUMMARY OF THE INVENTION

"Complex coacervation" a process wherein at least two oppositely electrically charged hydrophilic polymeric materials are caused to emerge from aqueous solution by being mutually attracted to and complexed with one another and by, thereby, having their solubility in the aqueous manufacturing vehicle decreased. In the instance of complex coacervation, the emergent phase contains substantially all of the electrically charged hydrophilic polymeric material utilized in forming the complex.

"Simple coacervation" includes a process wherein a single kind of hydrophilic polymeric material is caused to emerge from aqueous solution as a part of a separated liquid phase, by addition to the system, of some noncomplexing phase-separation-inducing material. The emergent phase contains a relatively high concentration of the hydrophilic polymeric material and that polymeric material does not rely solely on electrical charge or on complexing to sustain the phase separation.

The process of this invention pertains specifically to complex coacervation as it is defined above, and as it is known in the prior art. However, in prior processes for manufacturing capsule walls by complex coacervation, electrically charged organic hydrophilic polymeric materials have been used for both components of the complex. Also, in the processes of the prior art relating to liquid-liquid phase separation wherein inorganic salts are utilized, the phase separation has been disclosed to be of the simple coacervation kind. Such processes of simple coacervation have required the use of relatively high concentrations of simple inorganic salts and the salts remain in high concentration in the separated phase as well as in the continuous phase of the manufacturing vehicle. In manufacturing capsules, such relatively high concentrations of salt tend to remain in the capsule wall material and adversely affect the permeability of the capsule walls. Moreover, such salt contaminants are believed to cause sensitivity to humidity and moisture.

Complex coacervation of the present invention has several advantages over the complex coacervation of the prior art. Although high-quality gelatins are customarily used in both types of coacervation, the complex coacervation of the present invention makes use of relatively inexpensive inorganic polymeric polytungstate or polymolybdate the complexing phase-separation-inducing material while the complex coacervation of the prior art requires. Relatively expensive, organic polymeric complexing materials such as gum arabic or carrageenan.

Accordingly, it is an object of the present invention to provide a process for performing complex coacervation of organic hydrophilic polymeric material utilizing an electrically charged inorganic polymer of polytungstate or polymolybdate as the complexing, phase-separation-inducing material. It is an additional object of the present invention to provide a process for manufacturing, en masse, minute capsules utilizing the above-described complex coacervation process and the above-described inorganic polymeric material as complexing component of the capsule wall material.

It is another object of the present invention to provide minute capsules having improved impermeability, decreased sensitivity to moisture and humidity at ambient conditions and which require less expensive, complexing, phase-separation-inducing material in their manufacture. Another object of the present invention is to provide a process for making improved capsules by means of a novel complex coacervation wherein organic hydrophilic polymeric material can be of a lower quality and therefore less expensive than such hydrophilic polymeric materials used in past.

It is important to note, and should be understood, that the process of the present invention pertains to complex coacervation; and that the inorganic polytungstate or polymolybdate material which forms a part of the coacervate capsule wall is complexed with the organic polymeric material of the capsule walls as a natural consequence of the process of performing the phase separation. In this, improved, process for accomplishing complex coacervation, the inorganic material is polymeric in nature and does not adversely effect the capsule wall properties. Inorganic polymeric material complexed in the emergent phase with organic hydrophilic polymeric material, according to the present invention, has been found to provide capsule walls of improved quality.

The system resulting from the complex coacervation of the present invention comprises the separated phase which is, as was stated above, concentrated with regard to the complex of organic hydrophilic polymeric material and inorganic polymeric material. The remaining continuous manufacturing vehicle phase is relatively dilute in polymeric materials; such being true by the very definition of the term "complex coacervation" wherein two kinds of polymeric materials are combined as a complex by the attraction of opposite electrical charges.

The process of the present invention can be summarized as comprising the following steps:

a. preparing a liquid capsule manufacturing system by mixing an aqueous solution of organic hydrophilic polymeric material with an aqueous solution of electrically charged inorganic polymeric polytungstate or polymolybdate material—the mixture yielding a two-phase system comprising a continuous liquid phase relatively dilute in polymeric material and a discontinuous liquid phase of a multitude of dispersed droplets of an emergent phase relatively concentrated in a complex of the inorganic polymeric polytungstate or polymolybdate material and the organic hydrophilic polymeric material;

b. dispersing, into the capsule manufacturing system, a multitude of minute, intended capsule core entities; and c. maintaining the system for a time adequate to permit the dispersed intended capsule core entities to be wet and enwrapped by droplets of the emergent phase.

All of the components of the present capsule manufacturing system, including the intended capsule internal phase can, if desired, be combined into a single vessel, aqueous liquid added to yield solution of the soluble components, and agitation continued to manufacture capsules, all in one continuous step. Such a system can be considered to be a "pre-mix" of an encapsulation system. It should be understood that the intended capsule core material must be substantially insoluble in the capsule manufacturing vehicle and it should be further understood that the capsules or the capsule product of the novel encapsulating system is obtained when the dispersed capsule core entities have been wet and individually enwrapped by the emergent liquid phase. Such capsules can then be considered to be embryonic, liquid-walled, capsules and can, optionally, be subjected to further treatment in which the embryonic capsule wall material is further hardened. The additional treatment can comprise a simple lowering of the temperature or any of several other capsule wall material hardening treatments well known in the art.

A special feature of the process of the present invention and what is particularly considered to be novel resides in the use of electrically charged inorganic material as a complexing, phase-separation-inducing material in providing complex coacervation with an organic hydrophilic polymeric material.

Organic hydrophilic polymeric materials which are generally eligible for use in the practice of the present invention include any electrically charged, film-forming polymeric material soluble in an aqueous capsule manufacturing vehicle. The organic hydrophilic polymeric material generally has a net positive charge. Among such organic hydrophilic polymeric material can be listed: gelatin; poly(vinyl pyrrolidone); poly(ethyleneimine); and albumin, to mention a few representative examples.

Inorganic polymeric materials which are eligible for use in the practice of the present invention generally include any such polymeric material which carries a net electrical charge (the charge usually being negative) and which is soluble, in sufficient quantity, in the aqueous liquid of the phase separation manufacturing vehicle. Specifically preferred, among the eligible inorganic polymeric materials are polytungstates and polymolybdates.

Solvents eligible for use as manufacturing vehicle in the practice of the present invention are polar liquids having relatively high dielectric constants. The preferred solvent is water, but mixtures of water with alcohol, water with acetone, or generally, mixtures of water with another organic liquid solvent wholly or partially miscible in water are eligible. The additional organic liquid solvent utilized with water in the process of the present invention must be of an amount such that the combination of water and the additional organic solvent will still exhibit adequate dissolving power with respect to the polymeric materials. One reason for utilizing additional organic solvents in the manufacturing vehicle is that presence of an additional solvent permits alteration of the emergent phase viscosity. Alteration of the viscosity of the emergent liquid phase in this way, permits the use of a wider variety of capsule wall materials and permits an additional control in the size of capsules manufactured.

Capsule internal phase material in capsules of the present invention can be any of a multitude of different kinds and types of materials. The most important criteria in selection of the materials which are eligible for use are: (a) that the intended internal phase material be substantially insoluble in the capsule manufacturing vehicle and (b) that the intended capsule internal phase material usually be substantially nonreactive with other components of the capsule manufacturing system. A few of the materials which can be utilized as capsule internal phases include, among a multitude of others: water insoluble or substantially water insoluble liquids, such as olive oil, fish oils, vegetable oils, sperm oil, mineral oil, xylene, toluene, benzene, kerosene, chlorinated biphenyl, and methyl salicylate; substantially water insoluable metallic oxides and salts; fibrous materials, such as cellulose or asbestos; substantially water insoluble synthetic polymeric materials; minerals; pigments; glasses; elemental materials, including solids, liquids and gases; flavors; fragrances; reactants; biocidal compositions; physiological compositions; fertilizer compositions, and the like. In short, the materials which can be contained in capsules manufactured by the process of the present invention, can differ not only among themselves in their physical state, which can be solid, liquid, gas, or combinations thereof, but can differ in their chemical composition and in their intended use. The capsule wall materials in the present invention provide increased protection for the capsule internal phase materials, such as, protection from ambient conditions, protection from oxidation or ultraviolet radiation, protection from evaporation, from crystallization in solution, and the like.

The capsule walls, once formed, can be hardened by gelling (that is, by lowering the temperature) or they can be hardened by chemical reaction or complexing. The chemical hardening or complexing can be achieved by relatively well-known hardening agents for the organic hydrophilic polymeric material. Such hardening agents eligible for use include formaldehyde, glutaraldehyde, acrolein, glyoxal, cinnamaldehyde, tannin, and several others exhibiting like effect on the organic polymeric material, either in solution or in aqueous contact. Of course, the capsules can be used without the additional step of chemical hardening.

Capsules made according to the process of the present invention are substantially spherical, have seamless walls, and are not limited either as to size or as to internal phase contents. The broad range of internal phase contents was hereinabove disclosed and the size range of capsules made by the present invention can extend from a lower limit of a few to several microns up to a larger limit of several thousand microns in average diameter. The usual size for capsules made according to the present process are from about one or two microns to about 15,000 microns in average diameter. Capsules of the aforementioned size are considered to be minute and are preferred. The most usual size for capsules manufactured according to the present invention is within a range of from about 5 microns up to about 2,500 microns. Capsules made according to the present invention can be made to contain a range of amounts of internal phase material from 0 to more than 99 percent, by weight. The most usual and preferred range for the amount of material to be contained in the capsules is from about 50 to about 97 percent, by weight.

With respect to conditions for capsule manufacturing systems utilizing either simple or complex coacervation, the following ratios and ranges have been found to be useful as initial guide in characterizing particular manufacturing systems. The systems can be divided into solids content and ratio of organic polymeric material to inorganic polymeric material. In a system utilizing gelatin, for example, as the organic polymeric capsule wall material, the weight ratio of organic solid material to inorganic solid material is usually less than about 2 and preferably less than about 1 in simple coacervation and is usually greater than about 2 and preferably in a range of about 2 to 22, or perhaps slightly larger, for the case of complex coacervation.

The polymolybdate and polytungstate materials eligible for use in the complex coacervation of the present invention include water soluble and sufficiently hydrolyzed salts of ammonium or alkali metals in aqueous solution. For example, specific eligible materials include ammonium or sodium molybdate, trimolybdate, paramolybdate (sometimes named heptamolybdate), tungstate and tungstate dihydrate. Although the present invention is not limited as to the pH for the capsule manufacturing system, the preferred pH for complex coacervation of polyacids with gelatins is less than about 6 and, most preferably about 5.

DESCRIPTION OF PREFERRED EMBODIMENTS

Example 1

Into a vessel having a volume of approximately 1 liter and equipped for agitation and heating, there are added 200 milliliters of a 10 percent, by weight, aqueous gelatin solution having a temperature of about 60° centigrade. The gelatin used is acid-extracted pigskin gelatin having a Bloom strength of approximately 285 to 305 grams and an isoelectric point of about pH 8–9. Of course, the process is not intended to be limited as to kind or type of gelatin or even as to kind or type of electrically charged organic hydrophilic polymeric material. Also added to the vessel are 200 milliliters of water and 24 milliliters of a 10 percent, by weight, aqueous ammonium heptamolybdate solution. The temperature is maintained above the gelatin temperature of the separated phase. The pH of the system is about 5 and remains unadjusted throughout the process. Agitation is commenced and about 150 milliliters of toluene, an intended internal phase material for this example, are added to the system.

At the time of addition of the toluene, complex coacervation is seen to have already occurred and the forces of agitation have evenly dispersed minute globules of the liquid separated phase throughout the continuous phase of the capsule manufacturing system. The minute globules wet and enwrap individual minute particles of dispersed toluene to form embryonic capsules and the embryonic capsules continue to form and develop as the system is permitted to cool to a temperature below the gelatin temperature of the polymolybdate gelatin complex. After solidification of the embryonic capsule walls by cooling, the system is chilled to about 10° centigrade and 10 milliliters of a 25 percent, by weight, aqueous solution of glutaraldehyde is added to chemically harden the capsule walls. After further stirring for some hours, the capsule manufacturing system is filtered to separate the capsules from the manufacturing vehicle, the separated capsules can be washed with water and the capsule walls can be dried by conventional means utilizing a forced air blower.

The hard, glassy walled capsules are relatively water insensitive and are found to effectively contain the capsule internal phase.

Example 2 Into a vessel having a volume of approximately 1 liter and equipped for agitation and heating, there are added 100 milliliters of a 10 percent, by weight, aqueous gelatin solution having a temperature of about 70° centigrade. The gelatin used is of the same quality as that of example 1, above. Also added to the vessel are 200 milliliters of water and 15 milliliters of a 10 percent, by weight, (tungstic acid bases) sodium tungstate and about 100 milliliters of an intended capsule internal phase material. The temperature is maintained at about 35° centigrade, above the gelation temperature of the separated phase until liquid, embryonic capsule walls are well formed. The pH of the system has been adjusted to about 4.5 to 5.0 and maintained at that value. Cooling of the agitating system is commenced and when a temperature of about 25° centigrade is reached, about 250 milliliters of aqueous saturated sodium sulfate solution are added followed by additional, solid, sodium sulfate to reestablish saturation. To this saturated, agitating, system of capsules are added 5 milliliters of a 25 percent, by weight, aqueous solution of glutaraldehyde and 10 milliliters of a 10 percent, by weight, aqueous solution of gallic acid to cause chemical hardening of the capsule wall material. After continued stirring for more than one hour, the capsules are separated from the manufacturing vehicle, washed with water and dried as in example 1, above.

What is claimed is:

1. A process for manufacturing minute capsules, en masse, in an aqueous liquid capsule manufacturing vehicle comprising the steps of:
    a. mixing an aqueous liquid solution of an electrically charged organic hydrophilic polymeric material and an aqueous liquid solution of at least one oppositely electrically charged inorganic polymeric material taken from the group consisting of polymolybdates and polytungstates to yield the aqueous capsule manufacturing vehicle which comprises:
        i. a continuous aqueous liquid phase relatively dilute in both of the polymeric materials and
        ii. a discontinuous aqueous liquid phase of a multitude of dispersed droplets relatively concentrated in both of the electrically charged polymeric materials complexed together to serve as capsule wall material;
    b. dispersing into the capsule manufacturing system, a multitude of minute intended capsule core entities substantially insoluble in the liquid of the phase; and
    c. maintaining the mixing for a time sufficient to permit dispersed droplets of the complexed capsule wall polymeric materials to wet and individually enwrap the intended capsule core entities to yield capsules.

2. In a process for manufacturing minute capsules, en masse, in an aqueous liquid capsule manufacturing vehicle comprising the steps of:
    a. establishing an agitating three-phase aqueous liquid capsule manufacturing system wherein a major proportion of the system comprises
        i. a continuous phase of aqueous liquid,
        ii. a minor proportion of the system is a discontinuous phase of minute mobile particles of intended capsule core entities and,
        iii. a minor proportion of the system is a discontinuous phase of liquid globules of capsule wall material, the intended capsule core entities being wettable by the capsule wall material, the three phases being substantially mutually immiscible, and the liquid globules of capsule wall material being present in sufficient volume to wet and enwrap the capsule core entities; and
    b. hardening the capsule wall material wetting and unwrapping the capsule core entities the improvement which comprises effecting establishment of the phase including capsule wall material by complex coacervation of an electrically charged polymeric hydrophilic polymeric material using at least one inorganic polymeric material taken from the group consisting of polymolybdates and polytungstates.

3. The process of claim 2 wherein the organic hydrophilic polymeric material is gelatin.

4. In a process for manufacturing minute capsules, en masse, including a complex coacervate of oppositely charged polymeric materials comprising the steps of: dissolving at least two oppositely electrically charged hydrophilic polymeric materials in an aqueous manufacturing vehicle and adjusting conditions in the vehicle to yield an emergent liquid phase of a complexed combination of the hydrophilic materials: the improvement which comprises utilizing at least one electrically charged inorganic polymeric material taken from the group consisting of polymolybdates and polytungstates as one of the hydrophilic polymeric materials of the capsule wall forming complex coacervate and at least one electrically charged organic hydrophilic polymeric material as the other.

5. The process of claim 4 wherein the electrically charge organic hydrophilic polymeric material of the complex coacervate is gelatin.

* * * * *